United States Patent [19]

Stiner

[11] 4,193,561

[45] Mar. 18, 1980

[54] CLICKER DEVICE FOR FISHING REEL

[75] Inventor: Roy E. Stiner, Tulsa, Okla.

[73] Assignee: Brunswick Corporation, Skokie, Ill.

[21] Appl. No.: 932,463

[22] Filed: Aug. 10, 1978

[51] Int. Cl.² .............................................. A01K 89/02
[52] U.S. Cl. .............................................. 242/84.51 A
[58] Field of Search ................. 242/84.21 R, 84.21 A, 242/84.2 G, 84.5 A, 84.51 A

[56] References Cited

U.S. PATENT DOCUMENTS

| | | | |
|---|---|---|---|
| 2,676,769 | 4/1954 | Sarah | 242/84.21 R |
| 3,222,009 | 12/1965 | Sarah | 242/84.21 A |
| 3,223,349 | 12/1965 | Holahan | 242/84.2 A |
| 3,810,592 | 5/1974 | Host | 242/84.51 A |

Primary Examiner—Billy S. Taylor
Attorney, Agent, or Firm—John G. Heimovics

[57] ABSTRACT

This invention comprehends a device for producing a clicking sound that is part of the free-floating drag in spinning type fishing reels. When a fisherman is playing in a fish trying to land the fish, it has been found desirable to let the spool rotate slowly letting out a small amount of line so that the line will not snap in two. Since the fisherman is busy an audible clicking sound indicating that the spool is rotating is a help and assistance.

5 Claims, 10 Drawing Figures

CLICKER DEVICE FOR FISHING REEL

BACKGROUND OF THE INVENTION

1. Field of the Invention

This invention relates to spinning style fishing reels, and more particularly, relates to a clicker device that indicates when the spool that holds the line on the fishing reel is rotating.

2. Background of the Prior Art

It is well known in the prior art to have clicker devices that indicate that the spool is turning. In conventional and skirted type spinning reels this device is normally located behind the spool and connects in one manner or another to the reel's main shaft. This arrangement means that it is necessary to remove the reel's main shaft in order to remove the winding cup. In closed face style spinning reels the drag clicking device is also closely associated with the spool and thus subject to any type of trash and corrosive material (such as salt water) that might be on the fishing line when it is retrieved and rewound on the spool. The prior art fails to teach how a clicker device in spinning or spin casting reels can be associated away from the spool.

SUMMARY OF THE INVENTION

This invention relates to a clicker device on a spinning type reel that overcomes the difficulties of the prior art. The device comprehends using a unique free-floating drag located at the back of the housing. The unique drag has a rotatable drap cup that has teeth on the exterior periphery. The clicker device cooperatively operates in conjunction therewith.

It is therefore an object of this invention to provide a clicker device capable of producing an audible sound when the spool of a spinning style fishing reel is rotating.

It is another object of this invention to provide a clicker device that is mounted deep within the housing of the reel away from corrosive material that can be picked up by the fishing line.

A feature of this invention is utilizing the free-floating drag cup to provide a cyclic motion that is used by the clicker to make an audible sound.

The above and other and further objects and features will be more readily understood by reference to the following detailed description and accompanying drawings.

DESCRIPTION OF PREFERRED EMBODIMENTS

Figure 1:
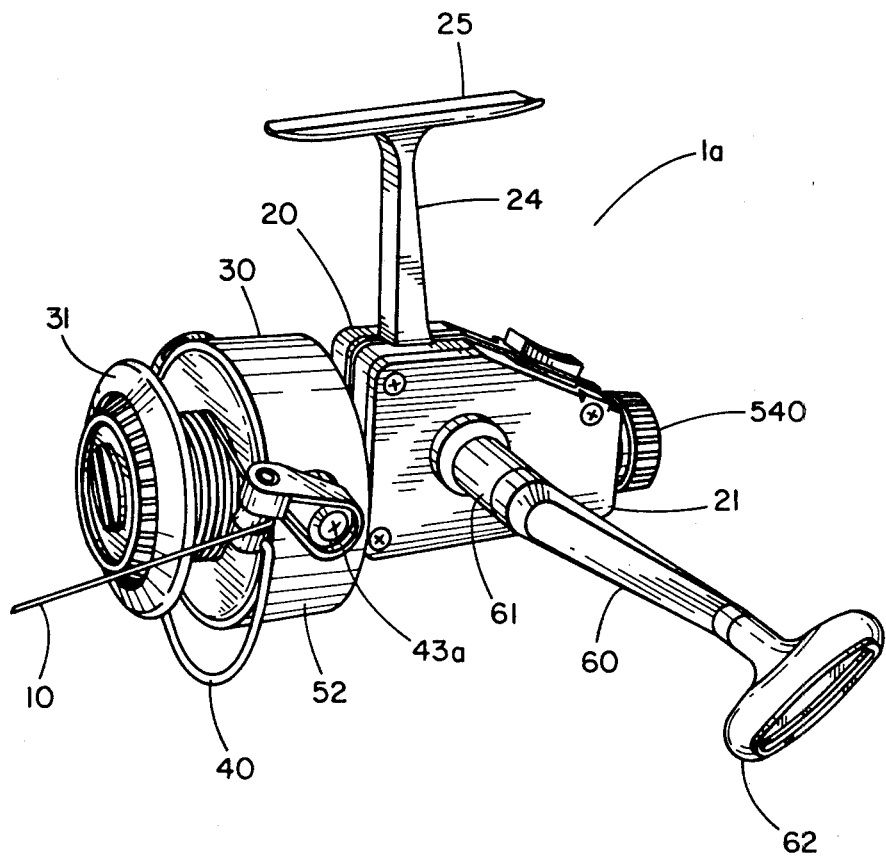
FIG. 1 is a perspective view of the conventional style spinning reel containing the invention described herein.
Figure 2:
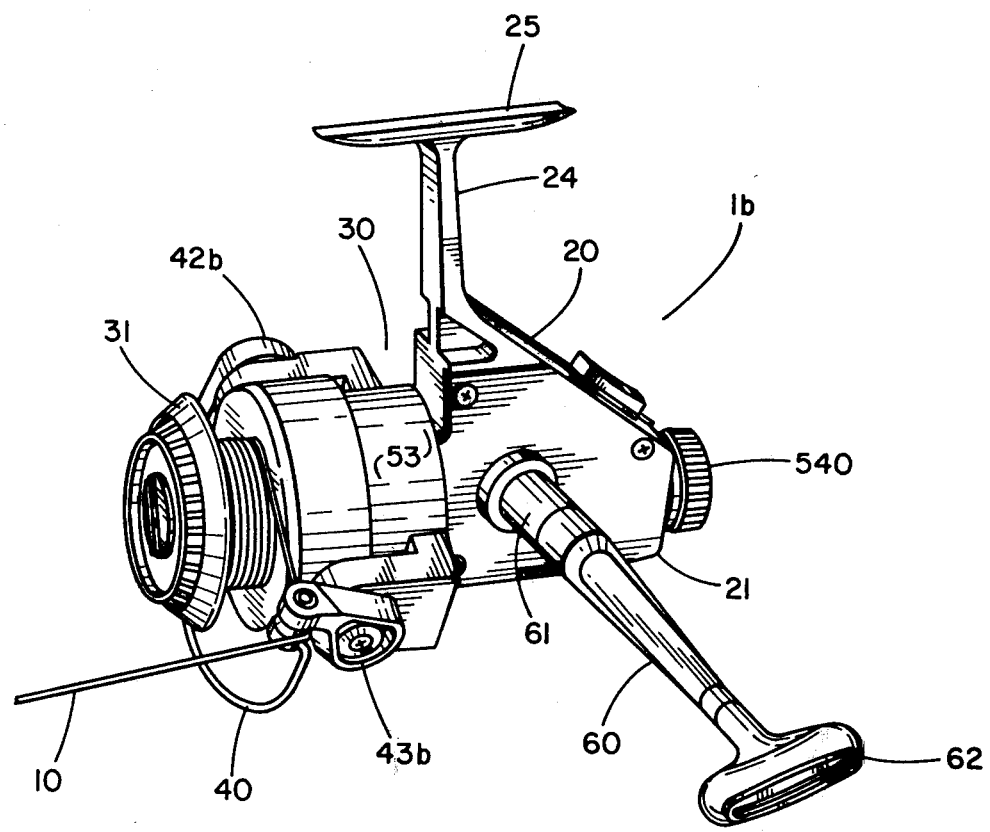
FIG. 2 is a perspective view of the skirted style spinning reel containing the invention described herein.

The invention comprehends a conventional style open-face fishing reel 1a as shown in FIG. 1 and a skirted style open-face fishing reel 1b as shown in FIG. 2. Both style of reels function similarly, the only exception being the arrangement of the spool. As used hereinafter, the same numerals will designate the common parts for both reels; for special parts on the reels different numerical designations will be used.

The reel 1a and having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitting rotation of the spool may occur during the line retrieval when a fish is on the other end of the line 10 fighting for its life while still in the water; and thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backwards. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
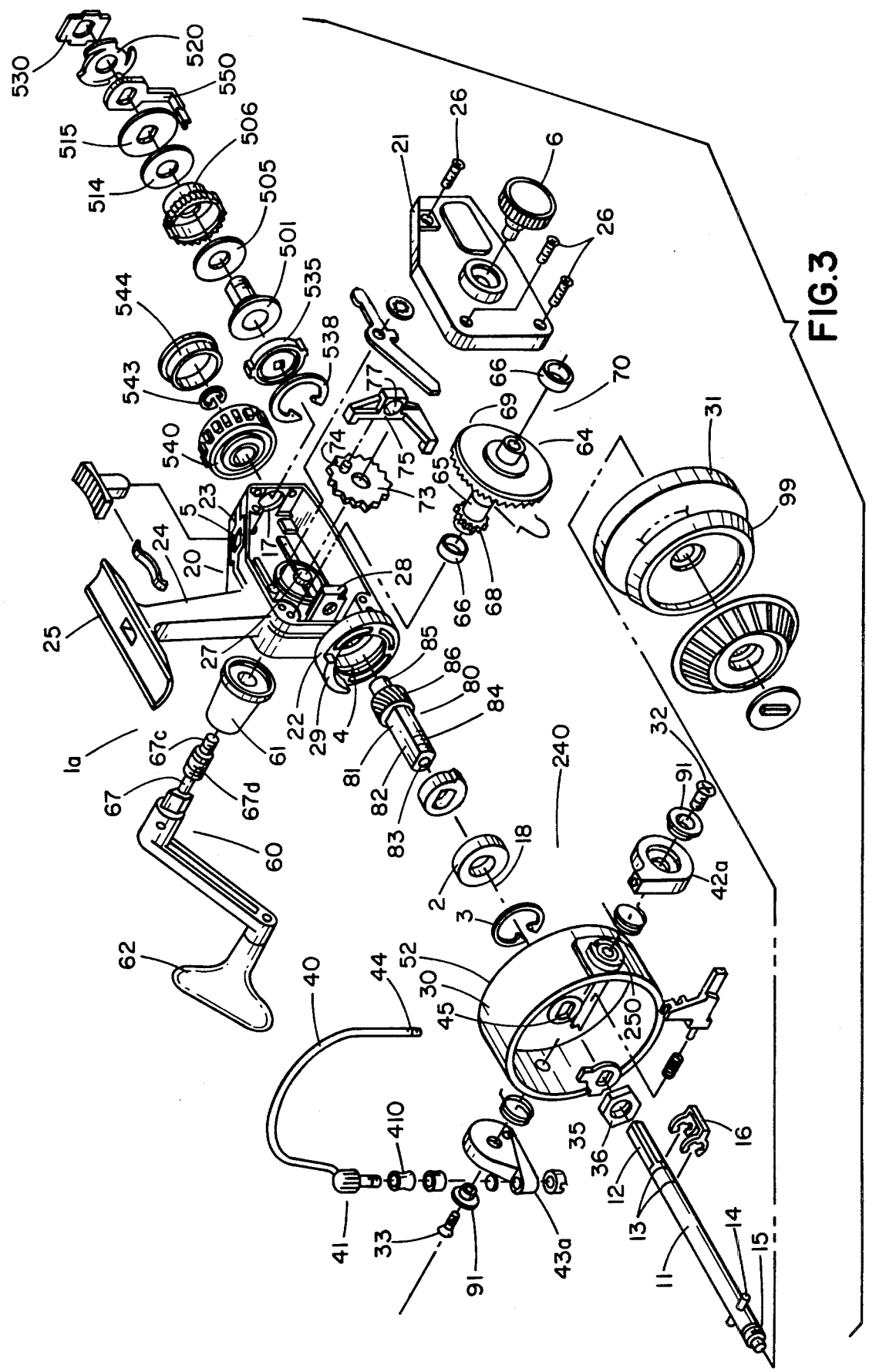
FIG. 3 is an exploded perspective view of the conventional style spinning reel containing the invention described herein.
Figure 4:
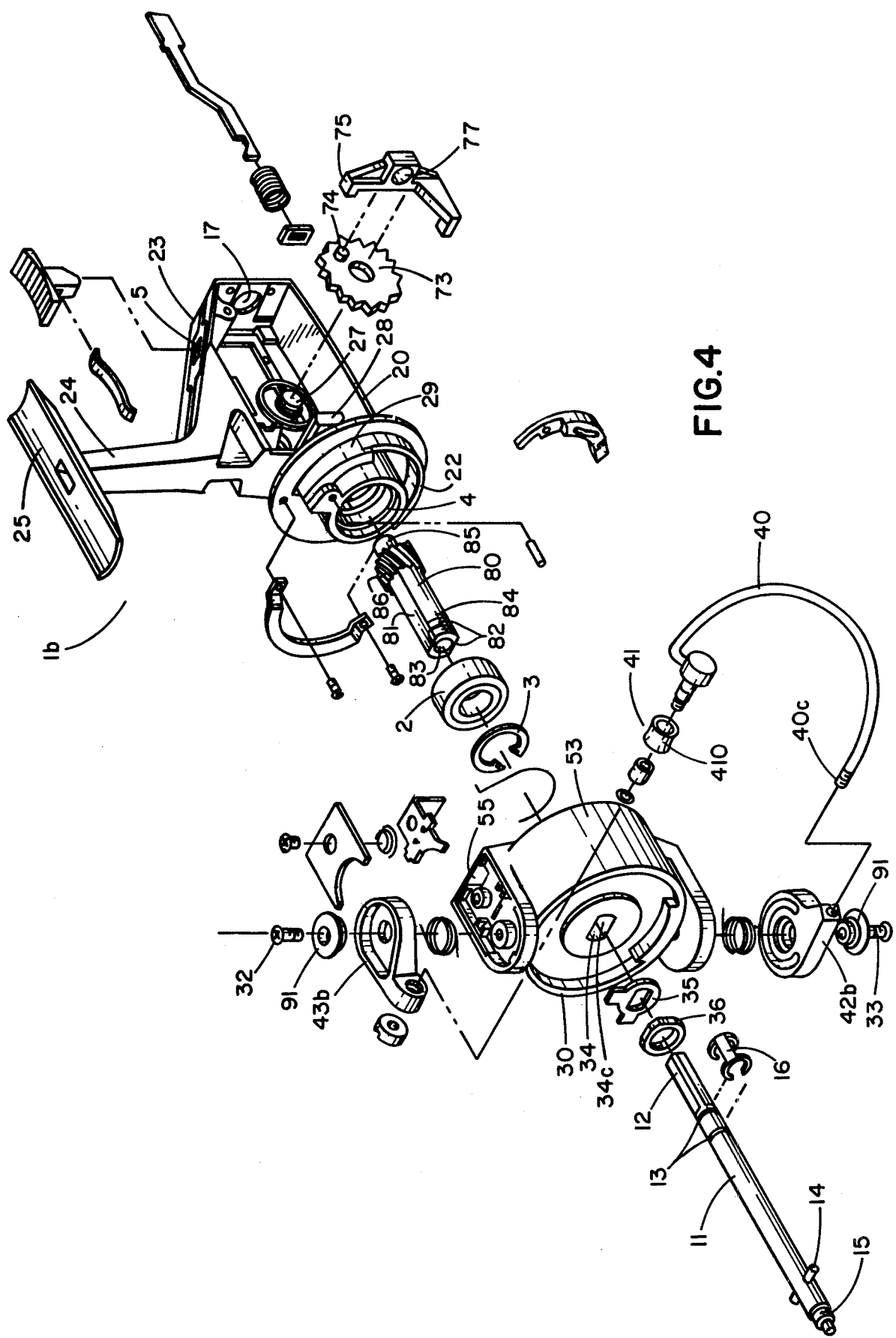
FIG. 4 is an exploded perspective view of the skirted style spinning reel not depicting some of the parts in common with the conventional reel shown in FIG. 3 but capable of incorporating the invention described herein.
Figure 5:
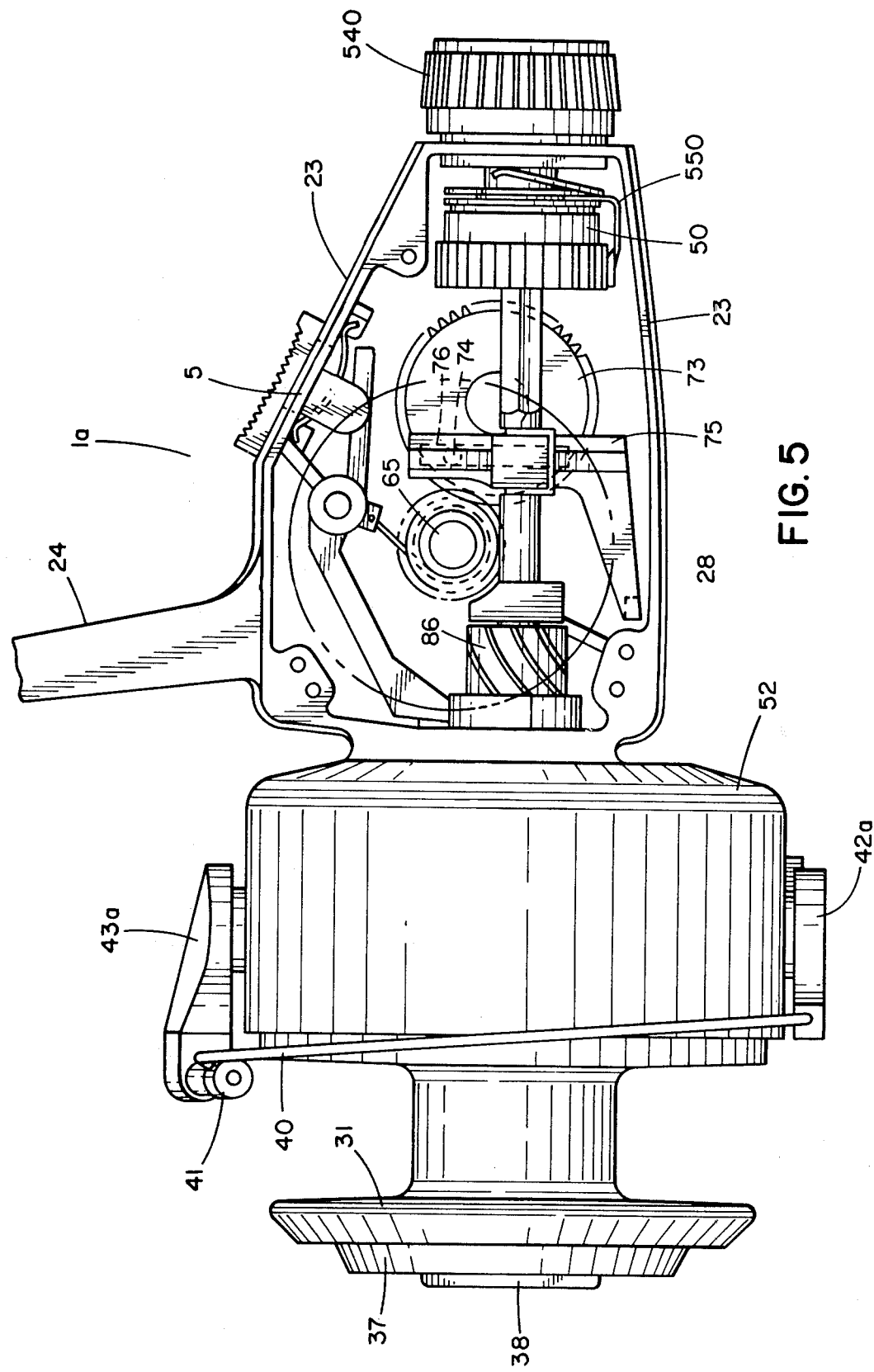
FIG. 5 is a cutaway side view of the conventional style spinning reel depicting the relative location of some of the parts of the reel.
Figure 6:
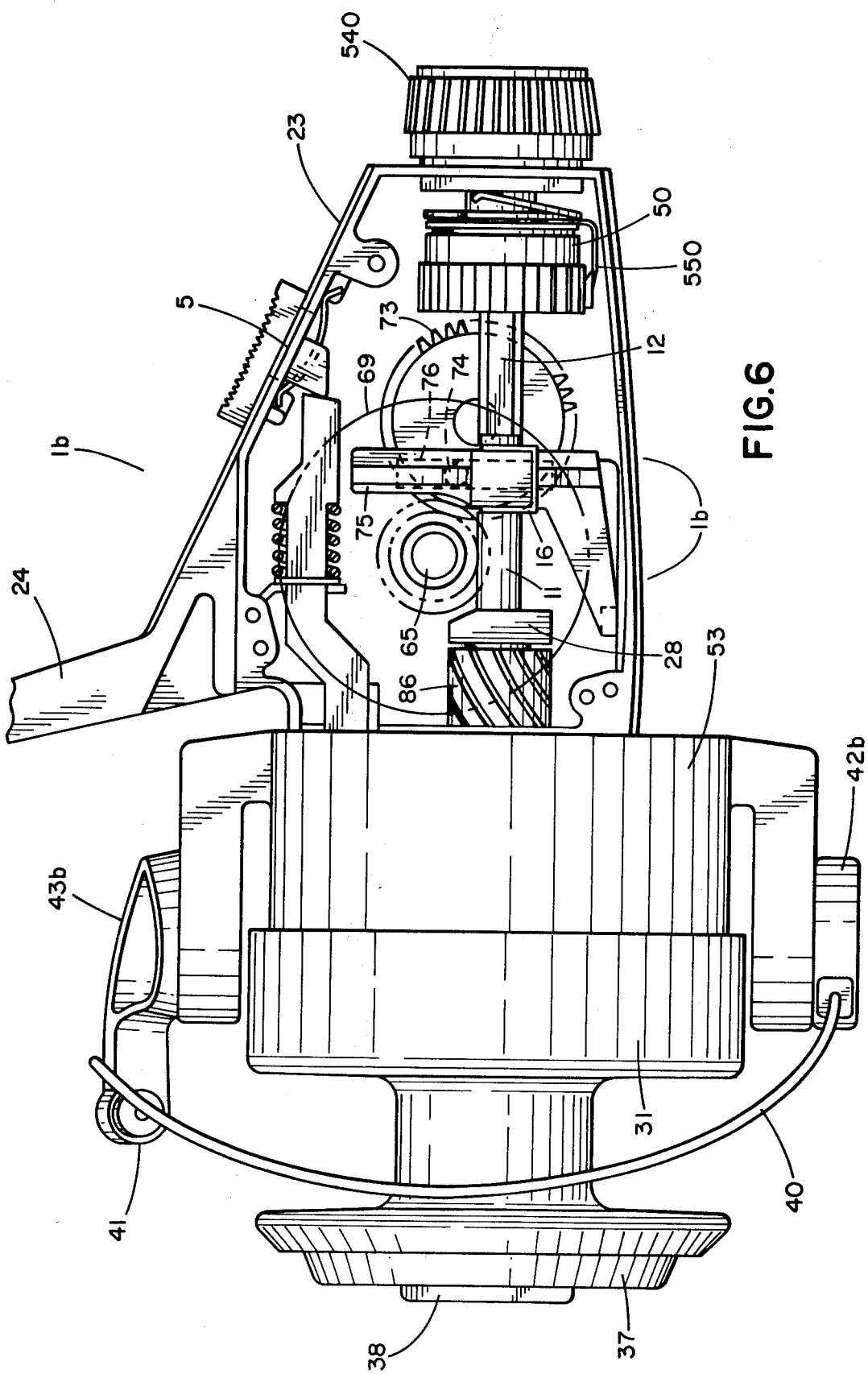
FIG. 6 is a cutaway side view of the skirted style spinning reel depicting the relative location of some of the parts of the reel.
Figure 7:
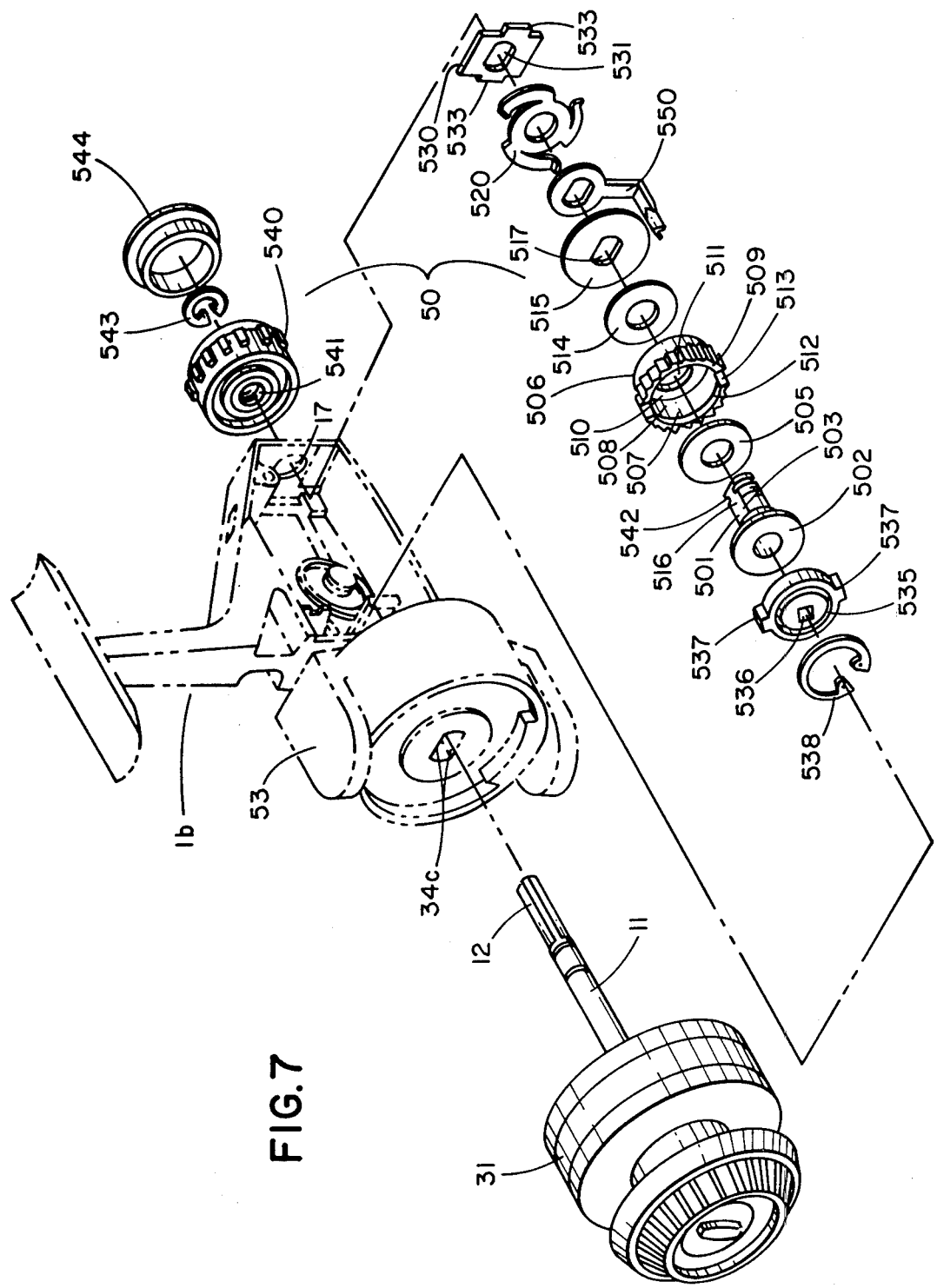
FIG. 7 is an exploded perspective view of the skirted style spinning reel shown in phantom and the drag mechanism shown in detail.
Figure 9:
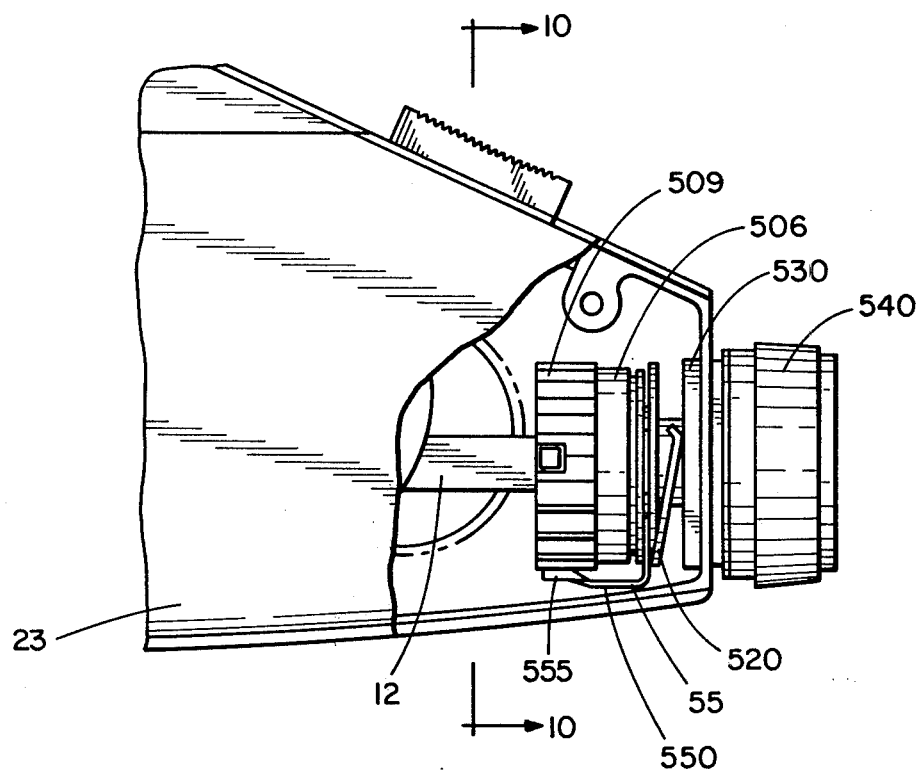
FIG. 9 is a partial cutaway side view of the embodiment of this invention.
Figures 8, 10:
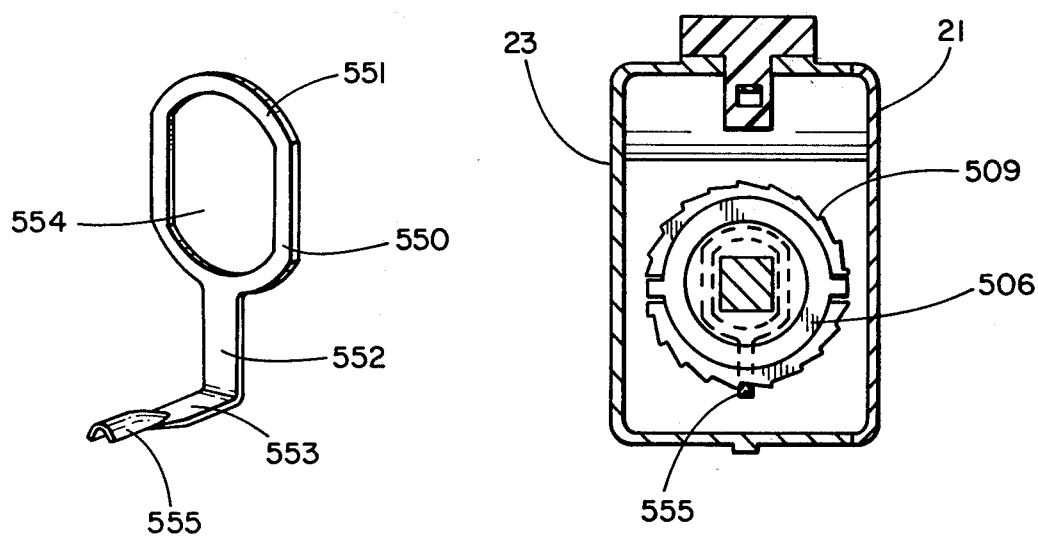
FIG. 8 is a perspective view of the clicker device of this invention.
FIG. 10 is a cross sectional view taken from FIG. 9 depicting the embodiment of this invention.

As best seen in FIGS. 3 and 7, the drag housing cup 506 has an internal cavity 507 with a back closure 510 with a concentric hole 511 therein. A first flat friction disc washer 505 with a round hole fits inside cup 506. The drag adjustment screw 501 with elongated shank 503 having a threaded portion at one end and side flats 516 is positioned so that the shank 503 extends out the back side of the closer 510. The disc 505 being captured between closure 510 and the washer portion 502 of the screw 501. A disc drive 535 with lugs 537 fits into the cup cavity 507 with the lugs 537 fitting in notches 513. Retainer clip 538 is secured to the front groove 512 to prevent the drive 513 from becoming disassembled from the cup 506. On the rearward extending shaft 503 a second friction disc 514, a flat washer 515 with hole 517 that matches the cross section of the shaft 503, a disc spring 512 and a rectangular aligning plate 530 with hole 531 similar to 517 is placed thereon. In one embodiment of the invention, clicker 550 is placed on the shank as shown in FIGS. 3, 5, 6 and 7. This compact unit comprises the forward portion of the drag mechanism 50 that is contained within the gear case 23. The remaining portion of the shank 503 slips through hole 17 at the back of the housing 20. Adjustment knob 540 is secured on the shaft 503 by means of internal nut 541 and locked in place by positioning retainer 543 in groove 542.

The square end 12 of the shaft 11 slip fits into hole 536. When the knob 540 is tightened against the housing case 23, spring 520 becomes trapped between the plate 530 and the washer 515. As the knob 540 is further tightened, the friction discs 505 and 514 clamp the back closure 510 tighter and tighter thereby preventing the cup 506 from rotating. Since the square end 12 of the shaft 11 is keyed to the drive 535 and the rectangular shape of plate 530 and the lugs 533 prevent the mechanism 50 from rotating inside the gear case 23, the shaft 11 is thereby prevented from rotating; thus the drag is fully functional and there is no rotational movement of the spool 31. When the knob 540 is loosened, there is less clamping force by the discs 505 and 514 and therefore limited rotation of the free-floating mechanism 50 is permitted which in turn permits limited rotation of the spool 131 when there is tension force on the line 10.

When a fisherman has a fish pulling on the line 10 then the drag mechanism 50 is normally set to let the spool 31 rotate slowly letting the line 10 slowly out. Since the fisherman is busy trying to land the fish, he does not have the time to observe the speed with which the spool 31 is rotating. Therefore a drag clicker device has been utilized to produce an audible "clicking" sound indicating if the spool 31 is rotating.

In the preferred embodiment of the invention shown in FIGS. 7, 8, 9 and 10, a drag clicker device 550 is depicted. On the free-floating drag 50 a clicker device 550 is mounted on elongated shank 503 between the washer 515 and the spring 520. The flats in the hole 554 keep the clicker 550 from rotating with respect to the shank 503. The washer base 551 has a radially extending leg 552 extending therefrom. At about 90° to the leg 552 is a longitudinal leg 553 approximately parallel with shank 503. The end 555 of the leg 553 is V-shaped. Alternatively, the end 555 could be slightly bent upward. The length of the legs 552 and 553 are arranged so that the end 555 comes into operative contact with the teeth 509 of the cup 506. When the cup 506 rotates because the spool 31 is rotating, the teeth 509 successively pass over the V-end 555 causing the resilient L-shaped legs 552 and 553 to vibrate. The gear case 23 acts as a sounding box and amplifies the clicking sound produced. Thus, this embodiment acts to notify the fisherman that the spool 31 is rotating and the rate of the clicking sound indicates the speed at which the spool 31 is rotating.

Although specific embodiments of the invention have been described, many modifications and changes may be made in the fishing reel without departing from the spirit and scope of the invention as defined in the appended claims.

What is claimed is:

1. In an open face sprinning reel used for casting a bait attached to a fishing line and for retrieving the bait and fishing line after casting, the reel having a housing, a center shaft mounted in the housing, a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, limited rotation of the spool being desirable when retrieving the bait with the fish caught thereon, a free-floating drag assembly having a cup mounted on a drag adjustment screw, an improved click signal device for indicating when the spool is rotating comprising:
 (a) a serrated tooth-shaped exterior surface on the cup, and
 (b) a clicker mounted on the screw and comprising a washer base with an L-shaped arm, one leg of the L secured to the washer and extending radially therefrom, the second leg projecting longitudinally such that the free end is in operable contact with the serrated tooth-shaped surface, whereby the arm vibrates making a clicking sound when the cup rotates.

2. The reel of claim 1 wherein the free end is slightly bent upward.

3. The reel of claim 1 wherein the free end is V-shaped.

4. The reel of claim 3 wherein the apex of the V is in contact with the teeth.

5. The reel of claim 1 wherein the reel housing has a partially hollow interior which acts as a sound amplifier for the clicking sound when it is generated.

* * * * *